Patented Oct. 24, 1950

2,526,643

UNITED STATES PATENT OFFICE 2,526,643

AMMONIUM THIOCYANATE-ALDEHYDE-FURFURYL ALCOHOL RESINS

Andrew P. Dunlop, Riverside, and Paul R. Stout, Chicago, Ill., assignors to The Quaker Oats Company, a corporation of New Jersey No Drawing. Application September 3, 1947, Serial No. 772,021

9 Claims. (Cl. 260—67)

This invention relates to novel synthetic resins of the thermosetting type which are formed by the condensation of furfuryl alcohol or furfuryl alcohol partial polymer (partially resinified furfuryl alcohol) with the resinous, partial reaction product of an aldehyde and ammonium thiocyanate.

These new resins when used alone or together with other resinous materials are useful in the preparation of solutions for protective coatings and varnishes and for impregnating and laminating purposes, and in the preparation of molded products. In connection with the latter use, the resin may be used in conjunction with suitable fillers. Surface coatings containing the resins are particularly useful as a sealer or finishing coat for table tops of wood and similar materials and for wire.

In general, the invention comprises the reaction under the influence of heat of ammonium thiocyanate and an aldehyde to form a resinous partial reaction product which can react with furfuryl alcohol or a furfuryl alcohol partial polymer to form a liquid thermosetting resin. The application of heat to the reaction mixture quickly brings about the formation of a water-insoluble, liquid thermosetting resin which, on further heating, converts to a solid and infusible resin resistant to both acidic and basic chemical reagents.

The partially polymerized furfuryl alcohol which may be used in accordance with the present invention is a pourable, partially resinified furfuryl alcohol of any desired viscosity. It may be prepared by any of the known methods, but we prefer to prepare it in accordance with the procedures described in our copending application Serial No. 758,508, filed July 2, 1947.

The reaction may be effected in an open vessel; however, we prefer to carry it out under reflux conditions. The reaction temperature may be room temperature or it may be an elevated temperature. In general, the reaction temperature may vary from about 15° or 20° to 110° C. The time of the reaction may vary widely from about 5 minutes to 2 hours, depending upon the temperature of the reaction and the proportion of the reactants used. In most instances the desired water-insoluble, liquid thermosetting resins are formed in about one to two hours at a reaction temperature of about 90°–110° C.

The character of the final infusible resinous product as to flexibility, adhesiveness and hardness can be controlled by varying the quantity of the reactants used within fairly wide limits. Equimolar proportions of the reactants may be used, or, the proportions may be varied from about ⅛ mole to one mole of ammonium thiocyanate to about 1–60 moles each of the aldehyde and the furfuryl alcohol or partial polymer thereof. In general, good results have been secured with equimolar proportions of the reactants and with proportions varying from about 1 mole of ammonium thiocyanate to about 1–30 moles each of the aldehyde and of the furfuryl alcohol or partial polymer thereof. The best results are secured when the proportions of reactants vary from 1 mole of ammonium thiocyanate and 1–4 moles each of the aldehyde and of the furfuryl alcohol or partial polymer thereof.

While formaldehyde is a preferred aldehyde in accordance with the present invention, any aldehyde which has the property of condensing with ammonium thiocyanate to form resinous materials may be used in accordance with our invention. The formaldehyde may be used as such or in a polymerized form. Examples of suitable aldehydes are formaldehyde, paraformaldehyde, trioxymethylene, acetaldehyde, butyraldehyde, acrolein, crotonaldehyde, glyoxal, benzaldehyde and furfural.

The following examples illustrate the preparation of resinous products in accordance with the present invention. It is to be understood that the invention is not limited to the specific conditions or details set forth in these illustrative examples. In all the examples parts given are parts by weight.

Example 1

15.2 parts (0.2 mole) ammonium thiocyanate and 32.4 parts of 37% formalin solution (0.4 mole) were heated at 50–80° C. for 15 minutes to form a sulfur-colored, thiocyanate-formaldehyde resin. The mixture was cooled and 39.2 parts (0.4 mole) furfuryl alcohol added and then refluxed for a period of two hours to yield a two-phase system containing water and a liquid resin which had a stroke cure of 1 minute and a solids yield of 74%.

The solids yield is determined by heating five to ten grams of the resin in an oven at 180°–200° C. for about 16 hours. The weight of the cured product so obtained, divided by the weight of reactants in the sample heated (excluding solvents such as water), gives the solids yield.

The stroke cure has been defined as the time required for a resin to convert from a fusible or liquid condition at a definite temperature while being stroked with a spatula to a condition at which the spatula either no longer sticks to the resin or slides over it with relative ease. In practice about 2 cc. of the resin is placed on a hot plate, the temperature of which is adjusted to 145°–150° C., and stroked (approximately 90-100 strokes per minute) with the flat side of a spatula to smooth the resin into a square 2 to 3 inches on a side. The time in seconds for the volatiles to evaporate, for the resin to start to become stringy or gummy and the cure time are recorded.

*Example 2*

15.2 parts of ammonium thiocyanate (0.2 mole) and 76.8 parts of furfural (0.8 mole) were heated under reflux at 70–90° C. for 90 minutes to give a liquid resin of rather low viscosity which had a stroke cure of 25 seconds. 80.5 parts of the resin so obtained were dissolved in 68.6 parts of furfuryl alcohol (1 mole furfuryl alcohol per mole of furfural) to give a solution which had a solids yield of 46% and a stroke cure of 6 seconds.

*Example 3*

7.6 parts of ammonium thiocyanate (0.1 mole) and 19.3 parts of a 30% glyoxal solution (0.1 mole) were refluxed for 20 minutes after which time 39.2 parts of furfuryl alcohol (0.4 mole) were added. The refluxing was continued for a period of 2 hours to give a liquid resin of a solids yield of 46%.

*Example 4*

76 parts of ammonium thiocyanate (1 mole), 70 parts of crotonaldehyde (1 mole) and 150 parts of water were refluxed for 2 hours. The mixture was then cooled and dehydrated under vacuum, during which time the temperature was not allowed to go above 50° C., until 142 parts of volatiles were removed. The resin was then dissolved in a mixture of acetone and water to give 510 parts of solution.

51 parts of the solution were distilled under vacuum to remove the acetone. 19.6 parts of furfuryl alcohol partial polymer were added and the mixture was heated under reflux at about 100° C. for one hour, to yield a liquid resin having a solids yield of 69%.

The furfuryl alcohol partial polymer used in this example was prepared by refluxing technical furfuryl alcohol for 68 hours. The resulting partially resinified furfuryl alcohol had a viscosity of about 2 centipoises at 25° C.

*Example 5*

The acetone from 102 parts of the thiocyanate-crotonaldehyde resin solution of Example 4 was removed under vacuum. 39.2 parts of furfuryl alcohol were then added and the mixture was heated under reflux at about 107° C. for a period of 2 hours. The resulting liquid resin had a solids yield of 68% and a stroke cure of 1½ minutes.

*Example 6*

Equimolar quantities of ammonium thiocyanate (76 parts) and 37% formalin (81 parts) were mixed and gently heated under reflux until spontaneous refluxing began. When this subsided, outside heat was applied to continue the refluxing for 15 minutes. The mixture was then diluted with 200 ml. of cold water and filtered. The residue was a solid yellow resin. It was ground in a mortar, triturated with water, filtered, and washed until the filtrate gave a negative ferric chloride test.

Technical furfuryl alcohol was refluxed for 68 hours, to give a partially resinified liquid of about 2 centipoises viscosity. 18.4 parts of this partially resinified furfuryl alcohol were mixed with 10 parts of the thiocyanate-formaldehyde resin and the mixture was heated at 105–110° C. under reflux for one hour. The resulting resin was a very viscous brown liquid with a stroke cure of 4 minutes and a solids yield of 74%.

In general, the resins prepared in accordance with the present invention cure rapidly at temperatures of about 150° C. to 175° C. without added curing catalysts. Curing catalysts such as hexamethylenetetramine do not appear to increase the rate of curing to any appreciable extent.

We claim:

1. A process of producing a new artificial resin which consists in condensing an aldehyde-ammonium thiocyanate partial resinification product with furfuryl alcohol until a liquid thermosetting resin is produced.

2. A process of producing a new artificial resin which consists in heating a mixture of an aldehyde and ammonium thiocyanate until a resinous, partial condensation product is formed and reacting said product with furfuryl alcohol until a liquid thermosetting resin is produced.

3. A process of producing a new artificial resin which consists in heating a mixture of formaldehyde and ammonium thiocyanate until a resinous, partial condensation product is formed and reacting said product with furfuryl alcohol until a liquid thermosetting resin is produced.

4. A process of producing a new artificial resin which consists in heating a mixture of furfural and ammonium thiocyanate until a resinous, partial condensation product is formed and reacting said product with furfuryl alcohol until a liquid thermosetting resin is produced.

5. A process of producing a new artificial resin which consists in heating a mixture of glyoxal and ammonium thiocyanate until a resinous, partial condensation product is formed and reacting said product with furfuryl alcohol until a liquid thermosetting resin is produced.

6. A process of producing a new artificial resin which consists in heating a mixture of crotonaldehyde and ammonium thiocyanate until a resinous, partial condensation product is formed and reacting said product with furfuryl alcohol until a liquid thermosetting resin is produced.

7. A process of producing a new artificial resin which consists in heating a mixture of an aldehyde and ammonium thiocyanate until a resinous, partial condensation product is formed and reacting said product with a partially resinified furfuryl alcohol until a liquid thermosetting resin is produced.

8. A process of producing a new artificial resin which consists in heating a mixture of crotonaldehyde and ammonium thiocyanate until a resinous, partial condensation product is formed and reacting said product with a partially resinified furfuryl alcohol until a liquid thermosetting resin is produced.

9. A process of producing a new artificial resin which consists in heating a mixture of formaldehyde and ammonium thiocyanate until a resinous, partial condensation product is formed and reacting said product with a partially resinified furfuryl alcohol until a liquid thermosetting resin is produced.

ANDREW P. DUNLOP.
PAUL R. STOUT.

REFERENCES CITED

The following references are of record in the file of this patent:

UNITED STATES PATENTS

| Number | Name | Date |
|---|---|---|
| 2,345,966 | Fiedler et al. | Apr. 4, 1944 |
| 2,368,426 | Root et al. | Jan. 30, 1945 |